(12) United States Patent
Kim

(10) Patent No.: US 9,075,277 B2
(45) Date of Patent: Jul. 7, 2015

(54) LIQUID CRYSTAL DISPLAY HAVING A WIDE VIEWING CHARACTERISTIC AND CAPABLE OF FAST DRIVING

(71) Applicant: Samsung Display Co., Ltd., Yongin (KR)

(72) Inventor: Dong-Gyu Kim, Yongin-si (KR)

(73) Assignee: Samsung Display Co., Ltd., Yongin (KR)

( * ) Notice: Subject to any disclaimer, the term of this patent is extended or adjusted under 35 U.S.C. 154(b) by 154 days.

(21) Appl. No.: 13/759,462

(22) Filed: Feb. 5, 2013

(65) Prior Publication Data

US 2013/0155344 A1 Jun. 20, 2013

Related U.S. Application Data

(62) Division of application No. 12/329,510, filed on Dec. 5, 2008, now Pat. No. 8,384,637.

(30) Foreign Application Priority Data

Mar. 5, 2008 (KR) ........................ 10-2008-0020363

(51) Int. Cl.
*G09G 3/36* (2006.01)
*G02F 1/1362* (2006.01)

(52) U.S. Cl.
CPC .. *G02F 1/136286* (2013.01); *G09G 2300/0426* (2013.01); *G09G 3/3659* (2013.01); *G09G 3/3677* (2013.01); *G09G 2300/0852* (2013.01); *G09G 2310/0251* (2013.01); *G09G 2320/0252* (2013.01); *G09G 2320/0261* (2013.01); *G09G 2320/028* (2013.01)

(58) Field of Classification Search
None
See application file for complete search history.

(56) References Cited

U.S. PATENT DOCUMENTS

| | | |
|---|---|---|
| 2005/0036091 A1 | 2/2005 | Song |
| 2006/0164352 A1 | 7/2006 | Yoo et al. |
| 2008/0024689 A1 | 1/2008 | Ahn |
| 2009/0015529 A1 | 1/2009 | Lai et al. |

FOREIGN PATENT DOCUMENTS

| | | |
|---|---|---|
| KR | 10-2005-0017371 | 2/2005 |
| KR | 10-2005-0018520 | 2/2005 |
| KR | 10-2006-0086175 | 7/2006 |

(Continued)

OTHER PUBLICATIONS

Non-Final Office Action dated Nov. 28, 2011 issued for related U.S. Appl. No. 12/329,510.
Final Office Action dated Jun. 20, 2012 issued for related U.S. Appl. No. 12/329,510.

(Continued)

*Primary Examiner* — Wayne Young
*Assistant Examiner* — Brian Butcher
(74) *Attorney, Agent, or Firm* — H.C. Park & Asssociates, PLC

(57) ABSTRACT

A charge sharing style wide viewing liquid crystal display to which fast driving pre-charging technology may be applied to is disclosed. A charge sharing style wide viewing liquid crystal display is provided such that charge sharing is carried out between a liquid crystal capacitor and a charge sharing capacitor that correspond to the $n^{th}$ gate line when the $m^{th}$ ($m \geq n+2$) gate line is turned on.

10 Claims, 4 Drawing Sheets

(56) References Cited

FOREIGN PATENT DOCUMENTS

| KR | 10-2008-0010987 | 1/2008 |
| KR | 10-2009-0054300 | 5/2009 |

OTHER PUBLICATIONS

Non-Final Office Action dated Oct. 5, 2012 issued for related U.S. Appl. No. 12/329,510.

Notice of Allowance dated Dec. 18, 2012 issued for related U.S. Appl. No. 12/329,510.

LIQUID CRYSTAL DISPLAY HAVING A WIDE VIEWING CHARACTERISTIC AND CAPABLE OF FAST DRIVING

CROSS REFERENCE TO RELATED APPLICATION

This application is a divisional of U.S. patent application Ser. No. 12/329,510, filed on Dec. 5, 2008, and claims priority from and the benefit of Korean Patent Application No. 10-2008-0020363, filed on Mar. 5, 2008, which is hereby incorporated by reference for all purposes as if fully set forth herein.

BACKGROUND OF THE INVENTION

1. Field of the Invention

The present invention relates to a liquid crystal display, and more particularly to a liquid crystal display that may have wide viewing characteristics and be capable of fast driving.

2. Discussion of the Background

A liquid crystal display (LCD) may have non-uniform display characteristics at is different viewing angles and inferior display quality of a moving image due to motion blur.

Therefore, various structures and driving methods have been suggested to decrease viewing angle dependency and improve the quality of moving images.

In a two thin film transistor (TFT) (T-T) structure, a pixel electrode is divided into a main-pixel electrode and a sub-pixel electrode, and different data voltages are applied to each electrode so that a voltage difference between two liquid crystal capacitors is generated. In a coupling capacitor (C-C) structure, a data voltage is applied to a main-pixel electrode and a sub-pixel electrode is capacitively coupled with the main-pixel electrode so that a voltage difference between two liquid crystal capacitors is generated. The T-T structure and the C-C structure are representative examples of a structure that may decrease viewing angle dependency.

But, in the T-T structure, the aperture ratio and the driving margin may be reduced because there are twice as many data lines or gate lines, and the manufacturing cost may increase due to the high price of multi-channel ICs.

In the C-C structure, the brightness may be reduced because the voltage of the sub-pixel electrode coupled with the main-pixel electrode may be low in comparison with the data voltage. Also, the degree to which viewing angle dependency may be reduced may be limited because the voltage of the sub-pixel electrode is determined by the capacitance ratio of insulating layers.

Korean Patent Application Nos. 2003-0056546, 2006-0071762, and 2007-0121092 are examples of charge sharing (CS) structures that may be able to solve the problem of the prior art described above. The CS structure may decrease viewing angle dependency without increasing the number of gate lines or data lines.

A 120 Hz fast driving technology, which has recently been applied to is commercial products, is a representative example of a driving method that may improve the display quality of a moving image. Because applying the 120 Hz fast driving technology may reduce the charging margin of the liquid crystal capacitor by half, the so-called pre-charging driving technology, in which turn-on times of neighboring gate lines overlap each other, is generally applied for compensation while column inversion driving is applied. If a 180 Hz (or more) fast driving technology is applied to a LCD having a full-high definition (full-HD) resolution, applying the pre-charging driving technology may be inevitable.

Because a pre-charging driving technology is operated such that turn-on times of neighboring gate lines overlap each other, if this driving method is applied to the CS structure, in which charge-sharing is carried out when a next neighboring gate line is turned on, differentiating the voltages between two sub-pixel electrodes may not occur properly so the viewing angle dependency may not be decreased.

SUMMARY OF THE INVENTION

The present invention provides a liquid crystal display in which charge-sharing is carried out between a liquid crystal capacitor and a charge-sharing capacitor that correspond to the $n^{th}$ gate line when an on-level gate signal is applied to the $m^{th}$ ($m \geq n+2$) gate line, but not to the neighboring $(n+1)^{th}$ gate line.

Additional features of the invention will be set forth in the description which follows, and in part will be apparent from the description, or may be learned by practice of the invention.

The present invention discloses a liquid crystal display including a substrate, a plurality of main gate lines disposed on the substrate, a plurality of data lines insulated from and is crossing at least one main gate line, a first liquid crystal capacitor and a second liquid crystal capacitor that each correspond an $n^{th}$ main gate line and an $i^{th}$ data line, a first switching element to selectively connect the first liquid crystal capacitor with the $i^{th}$ data line, a second switching element to selectively connect the second liquid crystal capacitor with the $i^{th}$ data line, and a voltage varying element to vary at least one of a terminal voltage of the first liquid crystal capacitor and a terminal voltage of the second liquid crystal capacitor that correspond to the $n^{th}$ main gate line, in response to a gate signal of the $m^{th}$ ($m \geq n+2$) main gate line.

The present invention also discloses a liquid crystal display, including a substrate; a plurality of main gate lines disposed on the substrate, a plurality of data lines insulated from and crossing at least one main gate line, a first sub-pixel electrode and a second sub-pixel electrode corresponding to an $n^{th}$ main gate line and an $i^{th}$ data line, a first switching element to selectively connecting the first sub-pixel electrode with the $i^{th}$ data line, a second switching element to selectively connect the second sub-pixel electrode with the $i^{th}$ data line, an auxiliary gate line disposed between neighboring two main gate lines, and a voltage varying element to vary at least one of a voltage of the first sub-pixel electrode and a voltage of the second sub-pixel electrode in response to a gate signal transmitted through the auxiliary gate line.

The present invention also discloses a liquid crystal display including a substrate, a plurality of main gate lines disposed on the substrate, a plurality of data lines insulated from and crossing at least one main gate line, an auxiliary gate line disposed between an $n^{th}$ main gate line and an $(n+1)^{th}$ main gate line, a first liquid crystal capacitor, a second liquid crystal capacitor, and a charge sharing capacitor corresponding to the $n^{th}$ main gate lines and an $i^{th}$ data line, a first switching element to selectively connect the first liquid crystal capacitor with the $i^{th}$ data line, a second switching element to selectively connect the second liquid crystal capacitor with the $i^{th}$ data line, and a third switching element to selectively connect at least one of the first liquid crystal capacitor and the second liquid crystal capacitor with the charge sharing capacitor in response to a gate signal of the auxiliary gate line. The auxiliary gate line is connected to an $m^{th}$ ($m \geq n+2$) main gate line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
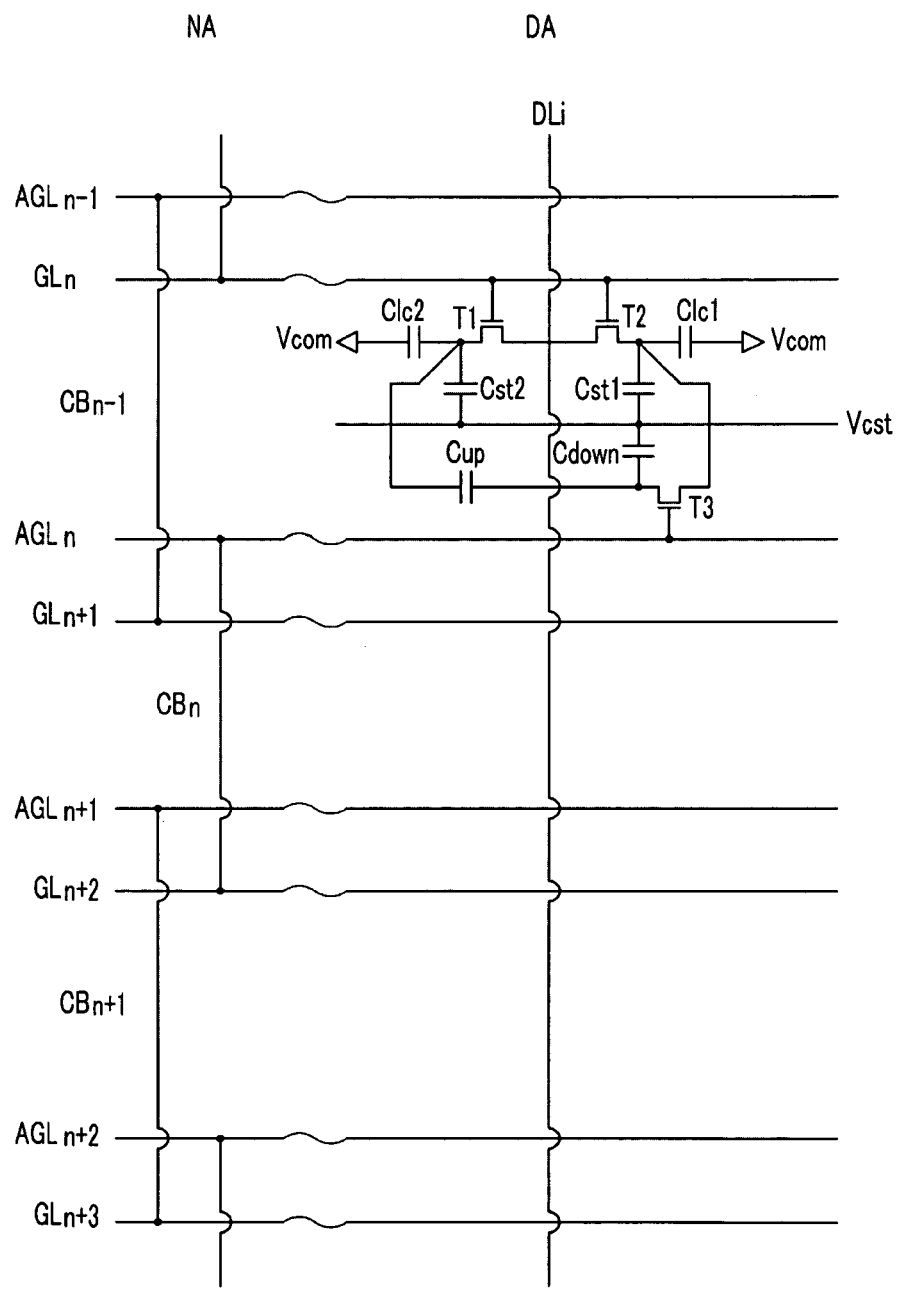
FIG. 1 is an equivalent electronic schematic of part of an LCD according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Figure 2:
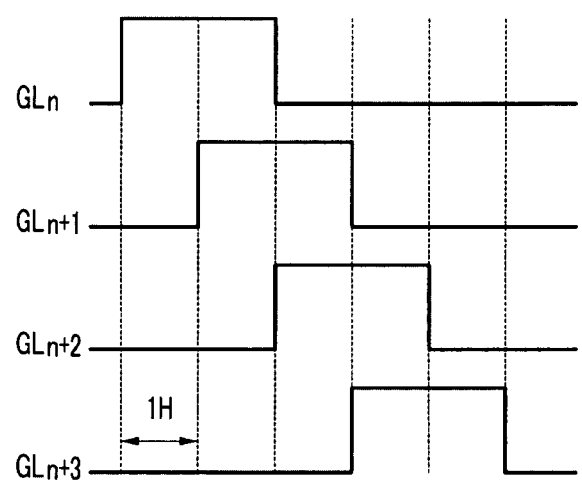
FIG. 2 is a schematic waveform of a gate signal applied to the gate line (GL) of FIG. 1.

FIG. 1 is an equivalent electronic schematic of part of an LCD according to an exemplary embodiment of the present invention, and FIG. 2 is a schematic waveform of a gate signal applied to the gate lines GL of FIG. 1.

The driving principle and the voltage variation of the first and second liquid crystal capacitors Clc1 and Clc2 of the present exemplary embodiment were set forth in U.S. patent application Ser. No. 11/726,984, which is hereby incorporated by reference. So, the detailed description will be focus on distinctions between the present exemplary embodiment and this application.

As shown in FIG. 1, the $n^{th}$ auxiliary gate line AGLn in the present exemplary embodiment is located between the $n^{th}$ gate line GLn and the $(n+1)^{th}$ gate line GLn+1. The $n^{th}$ is auxiliary gate line AGLn is connected to the $(n+2)^{th}$ gate line GLn+2 through the $n^{th}$ connecting bridge CBn so that the on-level gate signal applied to the $(n+2)^{th}$ gate line GLn+2 is directly transmitted to the $n^{th}$ auxiliary gate line AGLn.

As shown in FIG. 1, the connecting bridge CB may be located in the non-display area NA outside the display area DA.

In this exemplary embodiment, the $n^{th}$ auxiliary gate line AGLn is connected to the $(n+2)^{th}$ gate line GLn+2. Alternatively, the $n^{th}$ auxiliary gate line AGLn may be connected to the $k^{th}$ ($k \geq n+3$) gate line GLk.

The gate line GL that is to be connected to the auxiliary gate line AGLn is determined by the extent of superposition of the on-level of the gate signal for pre-charging.

For example, if the on-level of the gate signal of the gate line GLn is maintained for about two horizontal periods (2H) and the on-level of the gate signal of the $(n+1)^{th}$ gate line GLn+1 overlaps the on-level of the gate signal of the previous gate line GLn for about 1H like in the present exemplary embodiment, the $n^{th}$ auxiliary gate line AGLn may be connected to the $m^{th}$ ($m \geq n+2$) gate line GLm. If the on-level of gate signal of the gate line GLn is maintained for about 3H and the on-level of gate signal of the $(n+1)^{th}$ gate line GLn+1 overlaps the on-level of gate signal of the previous gate line GLn for about 2H, the $n^{th}$ auxiliary gate line AGLn may be connected to the $k^{th}$ ($k \geq n+3$) gate line GLk.

The operation of present exemplary embodiment will be described hereinafter.

Because the off-level gate signal is applied to the $n^{th}$ gate line GLn when the on-level gate signal is applied to the $(n+2)^{th}$ gate line GLn+2, the first liquid crystal capacitor Clc1 and the second liquid crystal capacitor Clc2 are electrically isolated from the data line DLi by first and second thin film transistors T1 and T2. On the other hand, when the on-level gate is signal is applied to the $(n+2)^{th}$ gate line GLn+2, the on-level gate signal is also applied to the $n^{th}$ auxiliary gate line AGLn, thereby turning on the third thin film transistor T3. Then, the first liquid crystal capacitor Clc1, the voltage down capacitor Cdown and the voltage up capacitor Cup are connected so that the terminal voltage of the first liquid crystal capacitor Clc1 decreases and the terminal voltage of the second liquid crystal capacitor Clc2 increases.

Even though not shown in detail in FIG. 2, there may be an interval between the time that the voltage of the $n^{th}$ gate line GLn changes from an on-level to an off-level and the time that the voltage of the $(n+2)^{th}$ gate line changes from an off-level to an on-level to prevent malfunction.

Although, the present exemplary embodiment includes a first storage capacitor Cst1 and a second storage capacitor Cst2, these elements may be omitted. Also, while the present exemplary embodiment includes both a voltage down capacitor Cdown and a voltage up capacitor Cup, the present invention is not limited thereto and may instead include only one of the voltage down capacitor Cdown and the voltage up capacitor Cup, or both the voltage down capacitor Cdown and the voltage up capacitor Cup may be omitted. Exemplary embodiments of the present invention may be applied to all structures which are formed as the voltage of the first liquid crystal capacitor Clc1 or the voltage of the second liquid crystal capacitor Clc2 is controlled by a turn on signal of a neighboring gate line.

Figure 3:
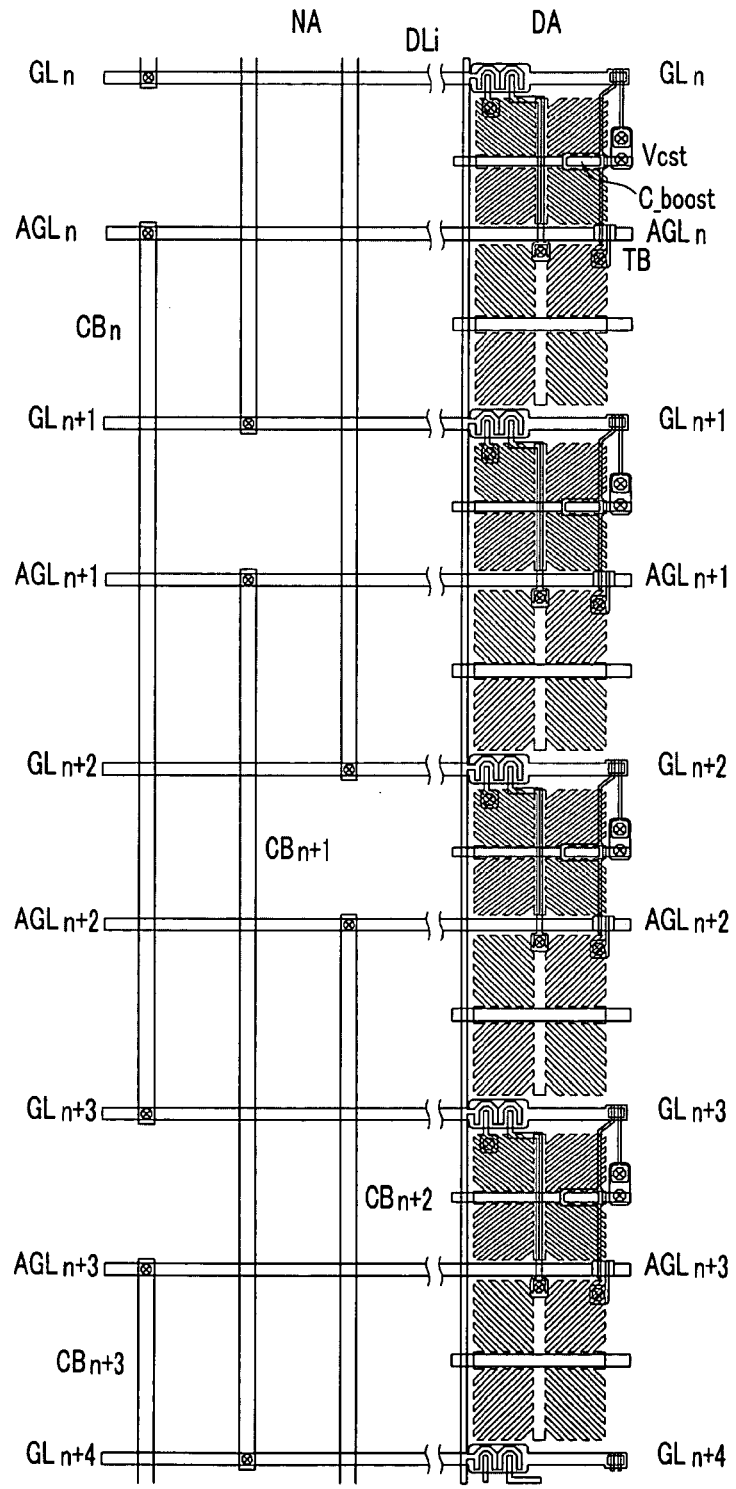
FIG. 3 is a schematic panel layout of an LCD according to another exemplary embodiment of the present invention.
Figure 4:
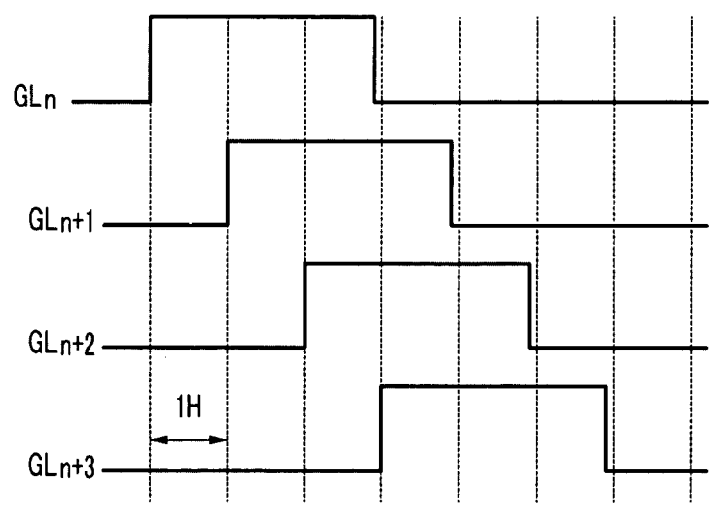
FIG. 4 is a schematic waveform of a gate signal applied to the gate line (GL) of FIG. 3.

FIG. 3 is a schematic panel layout of an LCD according to another exemplary embodiment of the present invention and FIG. 4 is a schematic waveform of a gate signal applied to a gate line GL of FIG. 3.

The micro-slit pixel structure according to the U.S. patent application Ser. No. 12/182,854, which is hereby incorporated by reference, and the voltage differentiating structure is according to U.S. patent application Ser. No. 12/275,673, which is hereby incorporated by reference, are applied to the present exemplary embodiment to obtain wide viewing characteristics. So, the detailed description will focus on the distinctions between the present exemplary embodiment and these applications.

In the present exemplary embodiment the turn-on times of two neighboring gate lines overlap for about 2H to obtain a driving margin as applied to the 180 Hz fast driving technology.

The $n^{th}$ auxiliary gate line AGLn of the present exemplary embodiment traverses the first sub-pixel electrode P1 and the second pixel electrode P2 and is connected to the $(n+3)^{th}$ gate line in the non-display area NA.

Accordingly, when the on-level gate signal is applied to the $(n+3)^{th}$ gate line GLn+3, the on-level gate signal is also applied to the $n^{th}$ auxiliary gate line AGLn connected to that, thereby turning on a boosting transistor TB. At this time, the first sub-pixel electrode P1 and the second sub-pixel electrode P2 are isolated from the data line DLi because the level of the gate signal applied to the $n^{th}$ gate line GLn has fallen to the off-level, and then, the voltage of the first sub-pixel electrode P1 rises due to the boosting transistor TB, and a boosting capacitor C_boost, so that the voltages of the first sub-pixel electrode P1 and the second pixel electrode P2 are different.

As shown in FIG. 4, it is desirable to have some interval between the time that the voltage of the $n^{th}$ gate line GLn transitions from the on-level to the off-level and the time that the voltage of the $(n+3)^{th}$ gate line GLn+3 transitions from the off-level to the on-level to prevent malfunction.

If the $n^{th}$ auxiliary gate line AGLn is connected to the $(n+1)^{th}$ gate line GLn+1 or is the $(n+2)^{th}$ gate line GLn+2, a voltage differentiating effect may not occur because the first sub-pixel electrode P1 and the second sub-pixel electrode P2 are connected to the data line DLi when the boosting transistor TB is turned on.

On the other hand, as shown in FIG. 3, the $n^{th}$ auxiliary gate line AGLn is connected to the $(n+3)^{th}$ gate line GLn+3 through the $n^{th}$ connecting bridge CBn located in the non-display area NA outside the display area DA. As FIG. 3 shows, the connecting bridges CB may be connected to the auxiliary gate lines AGL and the gate lines GL via contact holes, which are shown as a circled "x", in insulating layers therebetween. The connecting bridge CB may be formed when forming the pixel electrode by patterning a transparent conductive layer (e.g. an ITO layer or an IZO layer), which may be the same layer as the pixel electrode like in the present exemplary embodiment, or may be formed using a previously existing conductive layer like a data metal pattern without adding any further manufacturing processes.

In the present exemplary embodiment, the micro-slit structure is used as a pixel electrode structure to provide 4 domains. But exemplary embodiments of the present invention are not limited by this and various pixel electrode structures and various driving modes may be applied. In addition, although a pixel structure having two sub-pixel electrodes was applied in the present exemplary embodiment, a structure having more than two sub-pixel electrodes may be applied.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
a substrate;
a plurality of main gate lines disposed on the substrate;
a plurality of data lines insulated from and crossing at least one main gate line;
a first liquid crystal capacitor and a second liquid crystal capacitor corresponding to an $n^{th}$ main gate line and an $i^{th}$ data line;
a first switching element to selectively connect the first liquid crystal capacitor with the $i^{th}$ data line;
a second switching element to selectively connect the second liquid crystal capacitor with the $i^{th}$ data line;
an auxiliary gate line arranged in parallel with the main gate lines and disposed between two neighboring main gate lines; and
a voltage varying element to vary at least one of a terminal voltage of the first liquid crystal capacitor and a terminal voltage of the second liquid crystal capacitor in response to a gate signal of the $m^{th}$ (m≥n+2) main gate line,
wherein the auxiliary gate line corresponding to the $n^{th}$ main gate line is connected to the $m^{th}$ main gate line and the voltage varying element responds to the gate signal of the $m^{th}$ main gate line, which is transmitted through the auxiliary gate line corresponding to the $n^{th}$ gate line.

2. The liquid crystal display of claim 1, further comprising a third switching element to control an operation of the voltage varying element in response to the gate signal of the $m^{th}$ main gate line.

3. The liquid crystal display of claim 1, wherein the voltage varying element comprises at least one capacitor comprising two or more electrodes and one or more insulating layers.

4. The liquid crystal display of claim 1, further comprising a third switching element to control an operation of the voltage varying element by responding to the gate signal of the $m^{th}$ main gate line, which is transmitted through the auxiliary gate line corresponding to the $n^{th}$ gate line.

5. The liquid crystal display of claim 1, wherein the voltage varying element comprises at least one capacitor comprising two or more electrodes and one or more insulating layers.

6. The liquid crystal display of claim 1, further comprising a connecting bridge connecting the auxiliary gate line corresponding to the $n^{th}$ main gate line with the $m^{th}$ main gate line.

7. The liquid crystal display of claim 6, wherein the connecting bridge is disposed in a non-display area, the connecting bridge comprising the same material and being on the same layer as the data lines or one electrode of the first liquid crystal capacitor or the second liquid crystal capacitor.

8. A liquid crystal display, comprising:
a substrate;
a plurality of main gate lines disposed on the substrate;
a plurality of data lines insulated from and crossing at least one main gate line;
an auxiliary gate line arranged in parallel with the main gate lines and disposed between an $n^{th}$ main gate line and an $(n+1)^{th}$ main gate line;
a first liquid crystal capacitor, a second liquid crystal capacitor, and a charge sharing capacitor corresponding to the $n^{th}$ main gate line and an $i^{th}$ data line;
a first switching element to selectively connect the first liquid crystal capacitor with the $i^{th}$ data line;
a second switching element to selectively connect the second liquid crystal capacitor with the $i^{th}$ data line; and
a third switching element to selectively connect at least one of the first liquid crystal capacitor and the second liquid crystal capacitor with the charge sharing capacitor in response to a gate signal of the auxiliary gate line,
wherein the auxiliary gate line is connected to an $m^{th}$ (m≥n+2) main gate line.

9. The liquid crystal display of claim 8, further comprising a connecting bridge connecting the auxiliary gate line with the $m^{th}$ main gate line.

10. The liquid crystal display of claim 9, wherein the connecting bridge is disposed in a non-display area, the connecting bridge comprising the same material and being on the same layer as the data lines or a pixel electrode of the first liquid crystal capacitor or the second liquid crystal capacitor.

* * * * *